(12) United States Patent
Giuliani

(10) Patent No.: US 7,207,535 B1
(45) Date of Patent: Apr. 24, 2007

(54) MOUNTING DEVICE

(76) Inventor: Nicholas P. Giuliani, 2410 S. Coldwater Rd., Mt. Pleasant, MI (US) 48858

( * ) Notice: Subject to any disclaimer, the term of this patent is extended or adjusted under 35 U.S.C. 154(b) by 71 days.

(21) Appl. No.: 11/068,329

(22) Filed: Feb. 28, 2005

(51) Int. Cl.
*A47B 96/06* (2006.01)
*A47G 29/00* (2006.01)
*A47K 1/00* (2006.01)
*E04G 3/00* (2006.01)
*E04G 5/06* (2006.01)
*F21V 21/00* (2006.01)
*F21V 35/00* (2006.01)

(52) U.S. Cl. ................ 248/216.1; 248/684; 248/309.1; 248/309.2; 434/296; 43/3

(58) Field of Classification Search ............ 248/216.1, 248/684, 309.1, 309.2; 434/296; 43/3
See application file for complete search history.

(56) References Cited

U.S. PATENT DOCUMENTS

| | | | |
|---|---|---|---|
| 478,313 A * | 7/1892 | Davis | 411/342 |
| 657,491 A * | 9/1900 | James | 248/216.1 |
| 927,367 A * | 7/1909 | Marshall | 52/374 |
| 957,750 A | 5/1910 | Cunningham | |
| 2,256,778 A | 9/1941 | Lundgren | |
| 2,266,892 A * | 12/1941 | Mullen | 411/386 |
| 2,744,437 A * | 5/1956 | Murphy | 411/29 |
| 2,787,074 A | 4/1957 | Miller | |
| 2,885,813 A | 5/1959 | Kratzert | |
| 3,868,956 A * | 3/1975 | Alfidi et al. | 606/194 |
| 4,799,921 A * | 1/1989 | Johnson et al. | 604/506 |
| 4,931,059 A * | 6/1990 | Markham | 606/185 |
| 4,971,865 A | 11/1990 | Nowian | |
| 5,248,121 A | 9/1993 | Harrington | |
| 5,400,798 A * | 3/1995 | Baran | 600/567 |
| 5,515,637 A | 5/1996 | Johnson | |
| 5,549,633 A * | 8/1996 | Evans et al. | 606/139 |
| 5,607,395 A * | 3/1997 | Ragsdale et al. | 604/130 |
| 5,617,874 A * | 4/1997 | Baran | 600/558 |
| 5,779,294 A | 7/1998 | Magri | |
| 5,904,690 A * | 5/1999 | Middleman et al. | 606/113 |
| 6,045,570 A * | 4/2000 | Epstein et al. | 606/214 |
| 6,092,322 A | 7/2000 | Samaras | |
| 6,098,937 A * | 8/2000 | Carnahan et al. | 248/158 |
| 6,315,789 B1 * | 11/2001 | Cragg | 606/232 |
| 6,540,778 B1 * | 4/2003 | Quiachon et al. | 623/1.23 |
| 6,561,468 B2 | 5/2003 | Williamson | |
| 6,644,617 B2 * | 11/2003 | Pitlor | 248/544 |

* cited by examiner

*Primary Examiner*—Carl Friedman
*Assistant Examiner*—Michael McDuffie
(74) *Attorney, Agent, or Firm*—Robert L. McKellar; McKellar IP Law, PLLC

(57) ABSTRACT

A device for mounting taxidermy mounts, especially waterfowl and other birds. The mounting device prevents the mounted object from twisting or slipping on the mount and the mounted object can be prevented from sagging. The mounting device allows for the mounting of a mounting object in any position that is desired.

23 Claims, 1 Drawing Sheet

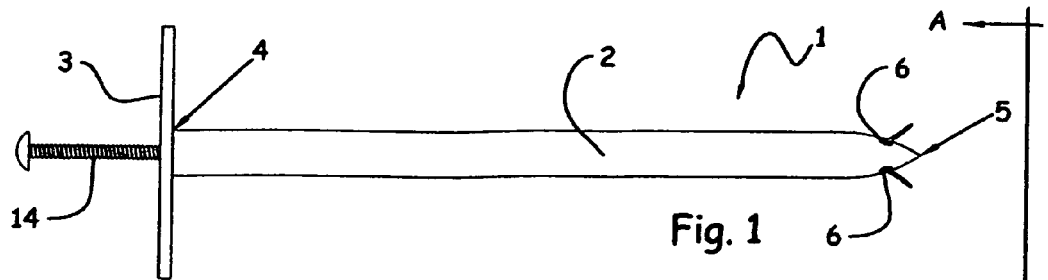
Fig. 1
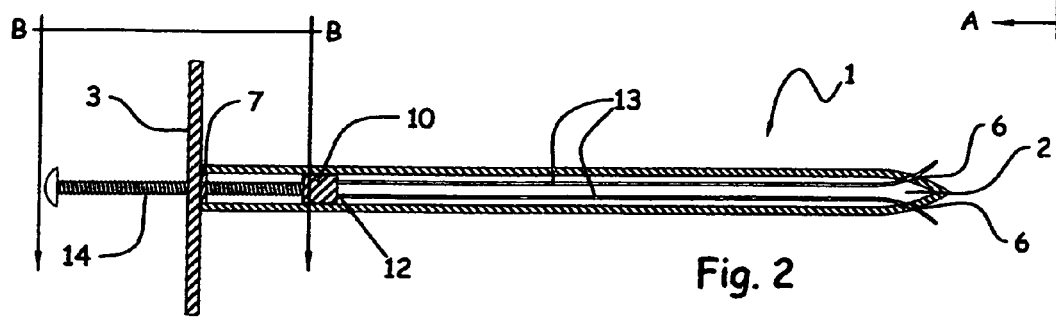
Fig. 2
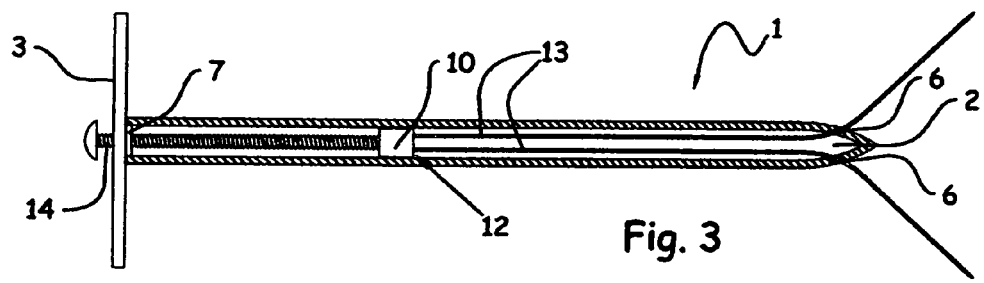
Fig. 3
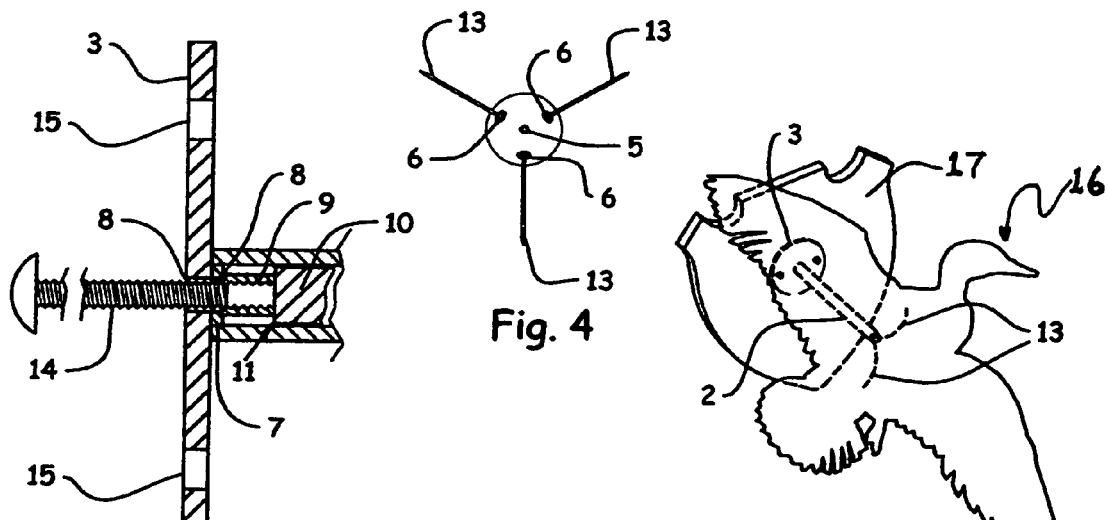
Fig. 4
Fig. 5
Fig. 6

MOUNTING DEVICE

BACKGROUND OF THE INVENTION

The present invention deals with a device for mounting taxidermy mounts, especially waterfowl and other birds, although, it is not limited to such waterfowl and other birds, and can be used in mounting animals as well.

An object of the invention is to provide a mounting device that will prevent the mounted object from twisting or slipping on the mount and a means by which the mounted object can be prevented from sagging. The mounting device of this invention allows for the mounting of a mounting object in any position that is desired.

Mounting devices, that are mostly used for mounting decoys for hunting, can be found disclosed in U.S. Pat. No. 957,750, issued May 10, 1910 to Cunningham for duck decoys; U.S. Pat. No. 2,256,778, that issued Sep. 23, 1941 to Lundgren for a duck decoy; U.S. Pat. No. 2,787,074 that issued to Miller on Apr. 2, 1957 for a duck decoy; U.S. Pat. No. 2,885,813, that issued on May 12, 1959 to Kratzert for a duck decoy; U.S. Pat. No. 4,971,865, that issued on Nov. 20, 1990 to Nowian for an antler mounting device; U.S. Pat. No. 5,248,121, that issued on Sep. 28, 1993 to Harrington for a dual purpose support apparatus for use in taxidermy; U.S. Pat. No. 5,515,637, that issued on May 14, 1996 to Johnson, for a turkey decoy; U.S. Pat. No. 5,779,294, that issued on Jul. 14, 1998 to Magri for a rod like mounting system; U.S. Pat. No. 6,092,322, that issued Jul. 25, 2000 to Samaras for a turkey decoy, and U.S. Pat. No. 6,561,468 that issued on May 13, 2003 to Williamson for a mounting system for displaying a bird.

The only device from the above-identified prior art that is used directly in the aesthetic displaying of mounted waterfowl is the Williamson device. That device is dependent on the use of an elongated rod that is pushed through a hole drilled into the body of the mounted specimen. The rod, which is treaded, is held secured in the specimen by the use of a spiked wedge device that is screwed into the mounted specimen to prevent the specimen from turning or moving on the elongated rod. Additionally, wires are used on the rod to help stabilize the specimen on the mounting rod.

SUMMARY OF THE INVENTION

What is disclosed and claimed herein is a mounting device for mounting wildlife specimens. The mounting device comprises an elongated hollow rod having a near end and a distal end and a mounting plate having a center portion. The mounting plate is attached to the near end of the elongated hollow rod at essentially the center portion of the mounting plate. The mounting plate has an opening centered in it and two adjacent openings on opposite sides of the mounting openings, wherein the centered opening is aligned with the near end of the elongated hollow rod.

The elongated rod has at least one opening near the distal end and contains in its hollow core, at least one wire, each wire having a long axis and each of the wires has a near end and a distal end. The distal end of each wire, respectively, protrudes through a wire opening near the distal end of the rod.

There is a cap mounted on the near end of the elongated rod, the cap having a centered, threaded, opening through it. There is a push pin located in the near end of the elongated rod between the cap and the near end of the wires.

Another embodiment of the invention is a combination, the combination comprising a mounting device as set forth above, and a threaded screw mounted in the threaded opening in the cap.

Yet another embodiment of this invention is a combination of a mounted specimen, mounted on a device of this invention, and the device of this invention mounted on a display backboard.

BRIEF DESCRIPTION OF THE DRAWINGS

FIG. 1 is a full side view of a device of this invention.

FIG. 2 is a cross-sectional view through A—A of FIG. 1 showing the placement of the various components of the invention.

FIG. 3 is a cross-sectional view through A—A of FIG. 1 showing the placement of the various components of the invention after the invention has been inserted into a mounted specimen and the wires extended.

FIG. 4 is a top view of a device of this invention showing three wires.

FIG. 5 is a cross-sectional view of a portion of the drive mechanism taken through line B—B of FIG. 2.

FIG. 6 is a view of a specimen mounted on a mounting backboard, showing a device of this invention used as the mounting device.

THE INVENTION

The invention herein consists of a mounting device for mounting wildlife specimens for display.

Turning to FIG. 1, there is shown a full side view of a device 1 of this invention which comprises an elongated hollow rod 2, that is attached to a mounting plate 3 at or near the center of the mounting plate 3. The elongated hollow rod 2 has a near end 4 and a distal end 5, and near the distal end 5 are openings 6 (two shown).

Located in the interior of the elongated hollow rod 2, and at the near 4, is a cap 7 (shown in FIGS. 2, 3, and 5) that is insertable into the near end 4 of the elongated hollow rod 2. The cap 7 has a centered opening 8 therethrough, which has interior threads 9 (see FIG. 5).

As shown in FIGS. 2 and 3, also located in the near end 4 of the elongated hollow rod 2 is a pusher pin 10, that is located between the end of the cap 7 and the near end 12 of the wires 13. Further shown is a threaded screw 14, which is used to push the pusher pin 10 against the near ends 12 of the wires 13. As the threaded screw 14 is moved inwardly into the elongated hollow rod 2, the pusher pin 10 is advanced against the near ends 12 of the wires 13 which advances the wires 13 down the elongated hollow rod 2 and out the openings 6.

Although the invention is not limited to only one sequence of manufacturing steps, the following is one method by which the device 1 can be manufactured, as the manufacturing method is not critical. In manufacture, the mounting plate 3 is first drilled to place the openings 15 which are used for mounting the device 1 on a standard wall or other stable fixture. The centered opening 8 is also drilled through the mounting plate 3. The elongated hollow rod 2 having a predetermined diameter is cut to a predetermined length and then the openings 6 are drilled into the distal end. The wires 13 are then inserted into the near end 4 of the elongated hollow rod 2, through the elongated hollow rod 2, and moved such that they protrude a small distance out the openings 6.

The push pin 10 is then inserted into the near end 4 of the elongated hollow rod 2, and then the cap 7 is inserted in the same near end. The cap 7 is attached to the interior of the elongated hollow rod 2 so that it will not twist in the near end 4 opening. The mounting plate 3 is then attached to the near end 4 of the elongated hollow rod 2 to cover the cap 7 and help hold the cap 7 in place. The elongated hollow rod 2 can be attached by any convenient means that will hold the elongated hollow rod 2 securely in place, such as welding, gluing, threading, or the like.

Finally, the threaded screw 14 is threaded into the opening 8. The device 1 is now ready for use.

In use, the specimen mounting position and the like are determined, and then an opening for the elongated hollow rod 2 is made in the appropriate place in the specimen. The elongated hollow rod 2 is inserted, and when positioned appropriately, the threaded screw 14 is advanced, thereby advancing the wires 13 inside of the elongated hollow rod 2 through the openings 6 and then beyond into the medium that is used inside of the mounting specimen.

The wires 13, because of the placement of the openings 6, and due to the configuration of the openings 6, direct the advancing wires 13 into the body of the specimen and thereby hold the specimen stable on the elongated hollow rod 1.

It should be noted by those skilled in the art that the openings 6 are generally drilled at an angle to the outside surface of the elongated hollow rod 2 so that it is easier to push the wires 13 through the holes 6. Also, the angle enhances the direction of the advancing wires 13 into the medium that is used for the mounting such that the wires 13 moves through the medium at almost a ninety degree angle to the long axis of the elongated hollow rod 2. Also, it should be noted that the distal ends of each of the wires is tipped up a slight degree to facilitate the insertion of each wire through its respective opening, and to allow for the movement of the wire through the mounting medium.

FIG. 6 is an illustration of a mounted bird specimen. There is shown a mounting backboard 17 on which is mounted a bird specimen 16, using a device 1 of this invention, in phantom. The device 1 is shown as the mounting plate 3, the wires 13 in an extended array, and the elongated hollow rod 2.

For purposes of this invention, the elongated hollow rod has an outside diameter in the range of about ¼ inch to about ¾ inches and has a length in the range of 4 to about 24 inches.

The wire that is useful herein has a gage in the range of about 8 to 20 and has a length in the range of about 4 inches to about 24 inches. The push pin for this invention has a gage in the range of about 8 to 20, and the length of the push pin is in the range of about 1/16 to 1 inch. The mounting plate, for purposes of this invention has a thickness of about ⅛ inch to about ¼ inch and the overall dimensions of the mounting plate is from 2 inches by 2 inches to about 6 inches by 6 inches.

Preferred for this invention is an elongated hollow rod of about 6 inches to about 18 inches and preferred for the gage of the wire is about 10 to about 15.

Most preferred for this invention is an elongated hollow rod selected from 8 inches, 10 inches, 12 inches, and 18 inches; wires having 16 gage and 12 gage; push pin having a 10 gage and being ¼ inches long, the threaded screw that is the driver for the wires, having a length of 3/32 inches up to 2 inches, and a mounting plate having the dimensions of 1½ inches by 2 inches and 2 inches by 3 inches.

What is claimed is:

1. A mounting device, said mounting device comprising in combination:
    an elongated hollow rod having a near end and a distal end, said elongated rod having at least one wire opening near the distal end;
    said elongated rod containing therein at least one wire, each wire having a long axis and each said wire having a near end and a distal end, the distal end of each wire, respectively, protruding through a wire opening near the distal end of the rod;
    a cap mounted on the near end of the elongated rod, said cap having a centered, threaded opening therethrough;
    a push pin located in the near end of the elongated rod between the cap and the near end of the wires;
    a mounting plate having a center portion, said mounting plate being attached to the near end of the elongated hollow rod at essentially the center portion of the mounting plate thereof, said mounting plate having an opening centered therein and two adjacent mounting openings therethrough.

2. A mounting device as claimed in claim 1 wherein the elongated rod has an outside diameter in the range of ¼ inch to ¾ inch and has a length in the range of 4 inches to 24 inches.

3. A mounting device as claimed in claim 1 wherein each wire has a gage in the range of 8 to 20 and has a length in the range of 4 inches to 24 inches.

4. A mounting device as claimed in claim 1 wherein the push pin has a gage in the range of 8 to 20 and the length of the push pin is in the range of 1/16 to 1 inches.

5. A mounting device as claimed in claim 1 wherein the mounting plate has thickness of from ⅛ inch to ¼ inch and the overall dimension of the mounting plate is from 2 inches to 6 inches.

6. The mounting device as claimed in claim 1 wherein there are two wires in the elongated rod.

7. The mounting device as claimed in claim 1 wherein there are three wires in the elongated rod.

8. A mounting device as claimed in claim 1 wherein the each opening in the distal end of the elongated rod is bored on an angle to the outside surface of the elongated rod such that as the wires are moved through the elongated rod and out of the openings, each of the wires diverges away from the outside surface of the elongated rod.

9. A mounting device as claimed in claim 1 wherein the tip of the distal end of each wire has a bend that is at least 30 degrees away from the long axis of the wire.

10. A mounting device as claimed in claim 1 wherein the elongated rod near end is fixedly attached to the mounting plate.

11. A mounting device as claimed in claim 1 wherein the elongated rod is attached to the mounting plate by threading the elongated rod into a centered opening in the mounting plate that is also threaded.

12. A mounting device as claimed in claim 10 wherein the elongated rod is welded to the mounting plate.

13. A mounting device as claimed in claim 1 wherein the mounting plate has a front surface and the adjacent mounting openings are countersunk in the front surface of the mounting plate.

14. A mounting device as claimed in claim 1 wherein the elongated rod is manufactured from metal.

15. A mounting device as claimed in claim 14 wherein the metal is aluminum.

16. A mounting device as claimed in claim 14 wherein the metal is steel.

17. A mounting device as claimed in claim 14 wherein the metal is iron.

18. A mounting device as claimed in claim 1 wherein the elongated rod is manufactured from plastic.

19. A mounting devices as claimed in claim 14 wherein the metal is bendable.

20. A mounting device as claimed in claim 1 wherein the rod cross section configuration is selected from the group consisting of:
  i. Round,
  ii. Square
  iii. Rectangular
  iv. Ellipsoidal
  v. Triangular
  vi. Hexagonal, and
  vii. Trapezoidal.

21. A mounting devices as claimed in claim 1 wherein the distal end of the elongated rod is closed.

22. A mounting device as claimed in claim 1, further comprising a wildlife specimen being mounted on a display backboard.

23. A mounting device, said mounting device comprising in combination:
  an elongated hollow rod having a near end and a distal end, said elongated rod having at least one wire opening near the distal end;
  said elongated rod containing therein at least one wire, each wire having a long axis and each said wire having a near end and a distal end, the distal end of each wire, respectively, protruding through a wire opening near the distal end of the rod;
  a cap mounted on the near end of the elongated rod, said cap having a centered, threaded opening therethrough;
  a push pin located in the near end of the elongated rod between the cap and the near end of the wires;
  a mounting plate having a center portion, said mounting plate being attached to the near end of the elongated hollow rod at essentially the center portion of the mounting plate thereof, said mounting plate having an opening centered therein and two adjacent mounting openings therethrough, there being a threaded screw mounted in the threaded opening in the cap.

* * * * *